(12) United States Patent
Hasselgren et al.

(10) Patent No.: US 12,112,422 B2
(45) Date of Patent: Oct. 8, 2024

(54) NOISE-FREE DIFFERENTIABLE RAY CASTING

(71) Applicant: NVIDIA Corporation, Santa Clara, CA (US)

(72) Inventors: Jon Niklas Theodor Hasselgren, Bunkeflostrand (SE); Carl Jacob Munkberg, Malmö (SE)

(73) Assignee: NVIDIA Corporation, Santa Clara, CA (US)

( * ) Notice: Subject to any disclaimer, the term of this patent is extended or adjusted under 35 U.S.C. 154(b) by 205 days.

(21) Appl. No.: 17/840,791

(22) Filed: Jun. 15, 2022

(65) Prior Publication Data

US 2023/0316631 A1   Oct. 5, 2023

Related U.S. Application Data

(60) Provisional application No. 63/321,828, filed on Mar. 21, 2022.

(51) Int. Cl.
*G06T 15/06* (2011.01)
*G06T 7/13* (2017.01)
*G06T 15/00* (2011.01)

(52) U.S. Cl.
CPC .............. *G06T 15/06* (2013.01); *G06T 7/13* (2017.01); *G06T 15/005* (2013.01)

(58) Field of Classification Search
CPC .......... G06T 15/06; G06T 15/005; G06T 7/13
USPC ................................................. 345/418, 419
See application file for complete search history.

(56) References Cited

U.S. PATENT DOCUMENTS

| | | | | |
|---|---|---|---|---|
| 2019/0333647 A1* | 10/2019 | Hoss | ...................... | G16H 40/20 |
| 2020/0043219 A1* | 2/2020 | Hunt | ...................... | G06T 19/20 |
| 2020/0051315 A1* | 2/2020 | Laine | .................... | G06T 17/005 |
| 2020/0279385 A1* | 9/2020 | Kirk | .................... | G06Q 30/0201 |
| 2021/0392316 A1* | 12/2021 | Bleyer | .................... | G06T 7/593 |
| 2022/0370033 A1* | 11/2022 | Klingensmith | ....... | G06T 7/0012 |

(Continued)

OTHER PUBLICATIONS

Bangaru, S., et al., "Unbiased Warped-Area Sampling for Differentiable Rendering," ACM Trans. Graph. 39, 6 (2020), 245:1-245:18.

(Continued)

*Primary Examiner* — Prabodh M Dharia
(74) *Attorney, Agent, or Firm* — Leydig, Voit & Mayer, Ltd.

(57) ABSTRACT

A differentiable ray casting technique may be applied to a model of a three-dimensional (3D) scene (scene includes lighting configuration) or object to optimize one or more parameters of the model. The one or more parameters define geometry (topology and shape), materials, and lighting configuration (e.g., environment map, a high-resolution texture that represents the light coming from all directions in a sphere) for the model. Visibility is computed in 3D space by casting at least two rays from each ray origin (where the two rays define a ray cone). The model is rendered to produce a model image that may be compared with a reference image (or photograph) of a reference 3D scene to compute image space differences. Visibility gradients in 3D space are computed and backpropagated through the computations to reduce differences between the model image and the reference image.

20 Claims, 13 Drawing Sheets

(56) References Cited

U.S. PATENT DOCUMENTS

2023/0281912 A1* 9/2023 Bigos ................ G06T 15/30
                                                        345/419

OTHER PUBLICATIONS

Laine, S., et al., "Modular Primitives for High-Performance Differentiable Rendering," ACM Transactions on Graphics 39, 6, Article 194 (2020).
Li, Tzu-Mao, et al., "Differentiable Monte Carlo Ray Tracing Through Edge Sampling," ACM Trans. Graph. (Proc. SIGGRAPH Asia) 37, 6 (2018), 222:1-222:11.
Loubet, G., et al., "Reparameterizing Discontinuous Integrands for Differentiable Rendering," ACM Trans. Graph. 38, 6 (2019).
Zhang, C., et al., "Path-Space Differentiable Rendering of Participating Media," ACM Trans. Graph. 39, 4 (2020), 143:1-143:19.

* cited by examiner

NOISE-FREE DIFFERENTIABLE RAY CASTING

CLAIM OF PRIORITY

This application claims the benefit of U.S. Provisional Application No. 63/321,828 titled "Noise-Free Differentiable Ray Casting," filed Mar. 21, 2022, the entire contents of which is incorporated herein by reference.

BACKGROUND

In differentiable path tracing, visibility gradients are computed through Monte Carlo integration using many samples. One approach is to directly sample geometric discontinuities using edge sampling, which is unbiased, but requires explicit tracking of silhouettes edges. Silhouette edge tracking can be expensive, especially for secondary rays and shadow rays. Another approach is explicit generation of boundary paths, which is a general, unbiased technique. However, explicit generation of boundary paths may lead to high variance in scenes with high geometric complexity, as the path space is vast. Yet another approach uses reparameterization which generally traces a few rays in a small cone footprint to detect a potential edge. When a potential edge is found, the integral over the footprint is reparameterized by a change of variables, carefully chosen to remove the visibility discontinuity caused by the silhouette edge, and the visibility gradients are evaluated using Monte Carlo integration. There is a need for addressing these issues and/or other issues associated with the prior art.

SUMMARY

Embodiments of the present disclosure relate to noise-free differentiable ray casting. Systems and methods are disclosed that enable optimization of a three-dimensional (3D) model of an object or scene. The differentiable ray casting technique is applied to a model of the 3D scene (scene includes lighting configuration) or object to optimize one or more parameters of the model. The one or more parameters define geometry (topology and shape), materials, and lighting configuration (e.g., environment map, a high-resolution texture that represents the light coming from all directions in a sphere) for the model. Visibility is computed in 3D space by casting at least two rays from each ray origin (where the two rays define a ray cone). The model is rendered to produce a model image that may be compared with a reference image (or photograph) of a reference 3D scene to compute image space differences. Visibility gradients in 3D space are computed and backpropagated through the computations to reduce differences between the model image and the reference image.

A method, computer readable medium, and system are disclosed. Rays that are each defined by a corresponding 3D origin and direction are cast into a 3D model defined by parameters, where at least two rays are cast into the 3D model from each 3D origin to determine model visibility data. Reference visibility data comprising an image of a reference 3D scene is received and at least one of the parameters of the 3D model are updated using computed visibility gradients to reduce differences between the model visibility data and the reference visibility data. In an embodiment visibility data comprises an image or a photograph. In an embodiment, at least a portion of the rays are cast into a reference 3D scene to compute the reference visibility data. In an embodiment, the parameters correspond to geometry (topology and shape) and material. In an embodiment, the parameters include lighting configuration.

In an embodiment, the 3D model is rendered according to the model visibility data to produce a model image and the reference 3D scene is rendered according to the reference visibility data to produce a reference image. Using the chain rule, image space gradients are combined with the visibility gradients to produce gradients needed to update the parameters to reduce differences between the model image and the reference image. In an embodiment, the model image and the reference image include shadows resulting from an object obstructing a light source. In an embodiment, the at least two rays cast from the same origin identify an edge of an object in the reference 3D scene. In an embodiment, an anti-aliased coverage value is computed based on the edge. In an embodiment, updating the parameters comprises propagating the visibility gradients to update the anti-aliased coverage value and deforming geometry of the model 3D scene based on the updated anti-aliased coverage value. In an embodiment, an analytical function is evaluated to compute the anti-aliased visibility value.

BRIEF DESCRIPTION OF THE DRAWINGS

The present systems and methods for noise-free differentiable ray casting are described in detail below with reference to the attached drawing figures, wherein.

DETAILED DESCRIPTION

Systems and methods are disclosed related to noise-free differentiable ray casting. The noise-free differentiable ray casting may be used to reconstruct a 3D model of a scene or an object using reference images of the scene or object or using the object itself. In an embodiment, analytically antialiased images of the 3D model being reconstructed are rendered via ray casting and differences between the rendered images and reference images are propagated backwards through the rendering computations to iteratively adjust the 3D model. Using an analytical function to render the 3D model, instead of evaluating an integral with many stochastically chosen samples, produces a noise-free 3D model and provides improved performance in terms of speed. The reason for lower noise levels compared with conventional techniques that rely on sampling with many rays is that an area-based Monte Carlo sampling step is replaced with an analytical test. The analytical test finds an edge and computes a fractional amount of a cone area (defined by the rays) that is covered by the triangle containing the edge. Furthermore, the recovered 3D model is accurate.

The ray casting technique is applied to a 3D model of the scene (a scene includes lighting configuration) or object to optimize one or more parameters of the 3D model. The one or more parameters define geometry (topology and shape), materials, and lighting configuration (e.g., environment map, a high-resolution texture that represents the light coming from all directions in a sphere) for the 3D model. Visibility is computed in 3D space by casting at least two rays from each ray origin (where the two rays define a ray cone). The 3D model is then rendered to produce a model image that is compared with a reference image (or photograph) of a reference 3D scene to compute image space differences. Visibility gradients in 3D space are computed and backpropagated through the computations to reduce differences between the model image and the reference image. The differences may be computed between pixel color in image space (by rendering the model and the reference). The visibility gradients may be used to optimize one or more of geometry (topology and shape), material parameters, and light configuration of the 3D model. If the reference images contain shadows, the shading fidelity may be increased through the rendering process, and the resulting model images are a close approximation of the reference photographs or images.

Figure 1A:
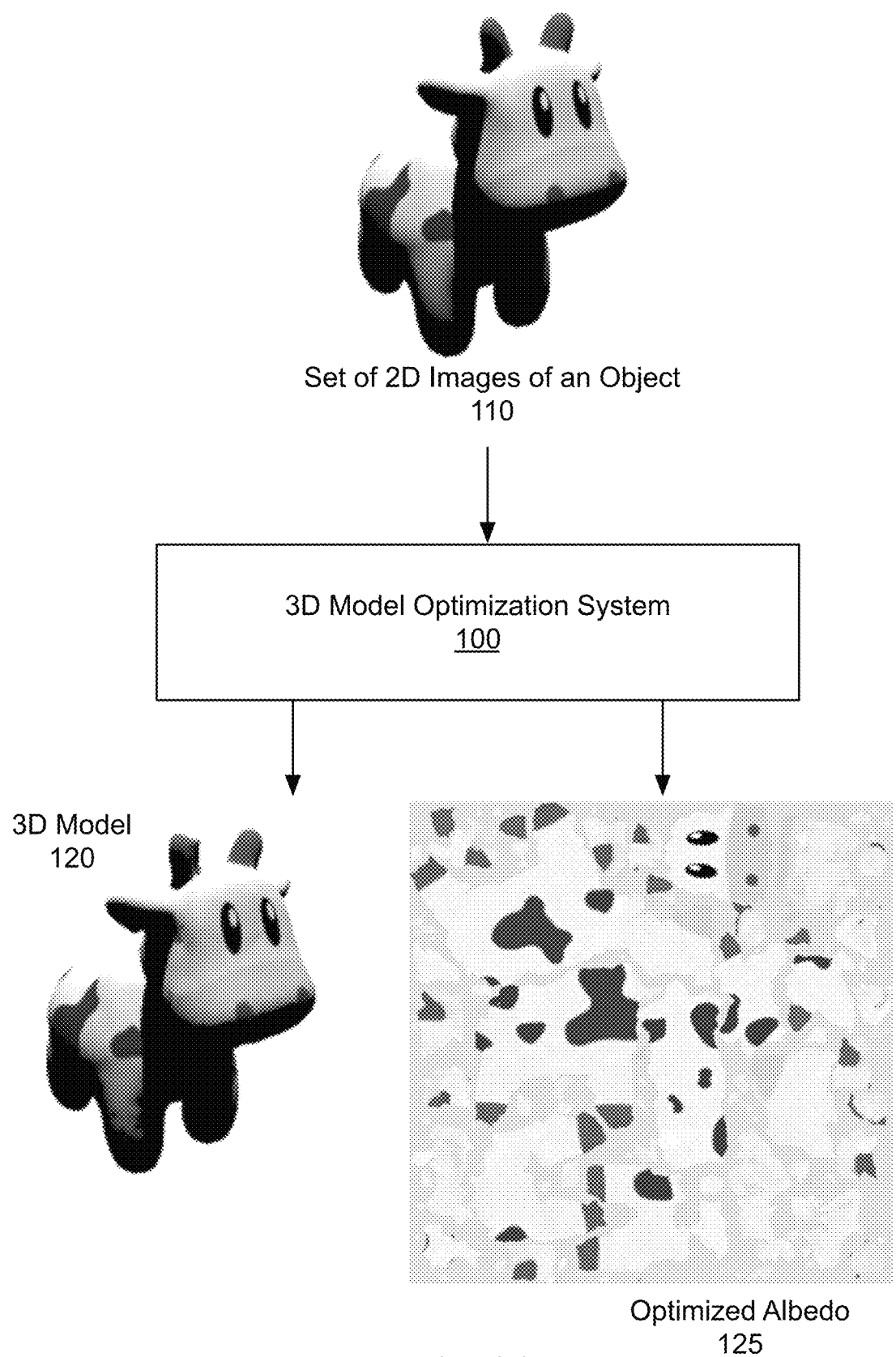
FIG. 1A illustrates a conceptual diagram of a 3D model optimization system, in accordance with an embodiment.

FIG. 1A illustrates a conceptual diagram of a 3D model optimization system 100, in accordance with an embodiment. A set of 2D images of an object 110 (cow) are captured from a variety of camera positions. The 3D model optimization system 100 constructs a 3D model 120 of the object using the set of 2D images to refine an initial 3D model. The initial 3D model may be a sphere or other geometric shape. In an embodiment, the 3D model 120 is a base model that is deformed to produce a specific 3D model corresponding to each of the 2D images in the set. In another embodiment, a complete 3D model 120 is constructed for each of one or more of the 2D images in the set. The 3D model 120 shown in FIG. 1A is rendered with shadows and the object self-shadows so that the chest region of the object is in shadow. Optimized albedo 125 is global surface texture defining material properties that may be applied to the 3D model 120.

Note that the optimized albedo 125 does not include shadow data because shadow terms are rendered separately by a differentiable renderer that casts rays from surfaces to each light source. In an embodiment, the optimized albedo 125 comprises a mip mapped texture. An initial global surface texture may be a constant color and the colors of each texel in the initial global surface texture are adjusted by the 3D model optimization system 100 to produce the optimized albedo 125.

The goal of the 3D model optimization system 100 is to produce the 3D model 120 that, when rendered using the optimized albedo 125 produces rendered images that closely match the set of 2D images of the object 110. Camera positions associated with the set of 2D images of the object 110 are used by the 3D model optimization system 100 to render the 3D model 120. Unlike conventional rendering systems having a goal of rendering high quality images, the 3D model optimization system 100 utilizes rendering to enable optimization of the 3D model 120. In other words, the rendered images are processed to determine and fine-tune the geometry that defines the 3D model 120. In an embodiment, the geometry is defined by locations of vertices that form a mesh of the 3D model 120. In an embodiment, the mesh is defined by other types of primitives or representations. In an embodiment, the set of 2D images of the object 110 comprise a video.

Optimization of the 3D model 120 may be used to perform markerless facial performance capture. Markerless means that there are no landmark points on the 3D model 120. The optimization process constructs the 3D model 120 reproducing facial expressions visible in the different 2D images. 3D model optimization enables generation of new images of the 3D model 120 for character animation, such as during gameplay or for film production.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

In another embodiment, the reference 3D scene or object is available and at least one ray from each origin (same origins as are used to render the 3D model) is cast into the reference 3D scene to render the reference image. Casting more than one ray from each origin produces an anti-aliased reference image.

Figure 1B:
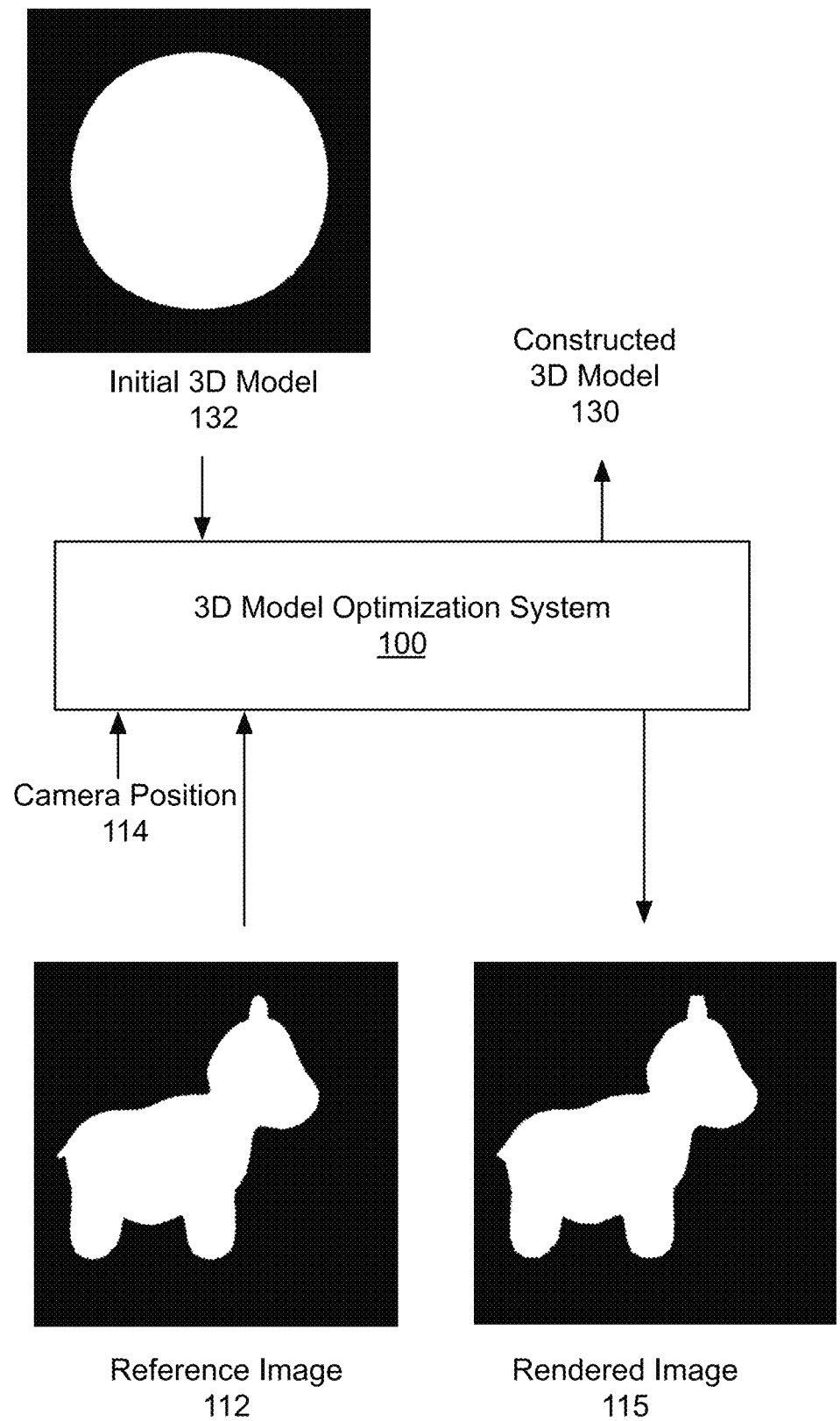
FIG. 1B illustrates conceptual diagram of a 3D model optimization system including differentiable ray casting, in accordance with an embodiment.

FIG. 1B illustrates another conceptual diagram of a 3D model optimization system 100, in accordance with an embodiment. The 3D model optimization system 100 receives an initial model 132 of an object and an initial global texture (not shown). Note that the initial model 132 is a 3D sphere that is represented by a 2D circle in FIG. 1B. The 3D model optimization system 100 also receives a set of 2D images of an object that may include the reference image 112. As previously described, the goal of the 3D model optimization system 100 is to find a global texture and a constructed 3D model 130, that when rendered from a camera position 114 associated with the reference image 112, produce a rendered image 115 that matches the reference image 112.

Rays are cast towards the initial 3D model 132 to determine visibility, more particularly to detect edges. The geometry of the initial model 132 is rendered and deformed according to visibility gradients over several learning passes to produce the constructed 3D model 130. The reference image 112 is a rendered image of a reference 3D object. By comparing the anti-aliased coverage obtained from each ray cast into the two versions of the scene (reference and model), a loss value for the rays where the coverage is different may be computed. The coverage differences are represented by visibility gradients that can be backpropagated through the rendering operations to update (e.g., deform) the initial 3D model 132 into the resulting constructed 3D model 130. The rendered image 115 of the resulting constructed 3D model 130 has a silhouette that closely matches the reference image 112. In an embodiment, the 3D model optimization system 100 compares the reference image 112 and the rendered image 115, determining image differences and computes an image-space loss. The image-space loss is then propagated backwards through the rendering operations to adjust the initial 3D model 132 and produce the constructed 3D model 130.

In contrast with conventional rendering systems that are configured to produce images from 3D geometry, the 3D model optimization system 100 includes a differentiable rendering pipeline. The differentiable rendering pipeline can produce images from 3D geometry in a forward operating mode and can also reconstruct 3D geometry from images in a backward operating mode. The rendering and backwards propagation may be repeated for several different reference images to iteratively adjust the initial 3D model 132, updating vertex positions of the initial 3D model 132 to correspond to the individual reference images. Rasterization uses rays with common origin traced through a 2D screen space grid, and is limited to rendering an image with planar projection from a single camera position. In contrast with rasterization, rays can be traced with arbitrary origins and direction, allowing more flexibility for effects such as reflection, refraction, and shadow testing.

In an embodiment, the rendered image 115 and other images rendered by the 3D model optimization system 100 are antialiased images, where the antialiasing operation processes geometry data (e.g., vertex locations or primitives) associated with the initial 3D model 132 or base mesh to antialias the image. In an embodiment, the antialiasing operation is an analytic antialiasing operation based on 3D geometry that determines a coverage value for a ray cone having a center ray as its axis during ray casting.

In an embodiment, texture coordinates of the initial 3D model 132 are associated with each vertex defining the initial 3D model 132 and the association between the vertices and texture coordinates is unchanged even when locations of the vertices are modified to produce the constructed 3D model 130. However, contents of the global texture are adjusted as the constructed 3D model 130 is modified.

Figure 2A:
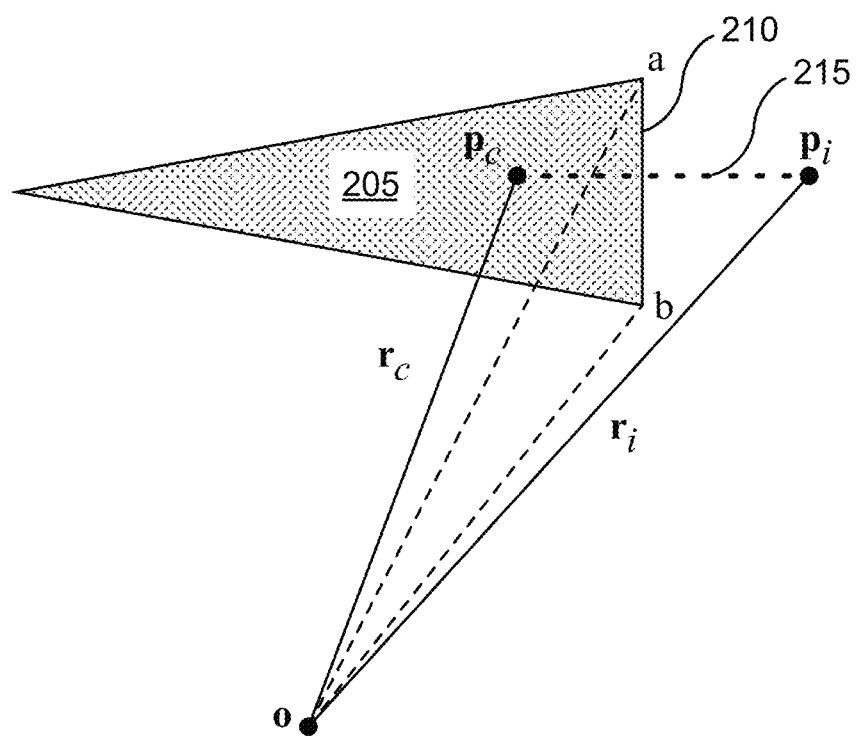
FIG. 2A illustrates two rays cast into a 3D scene suitable for use in implementing some embodiments of the present disclosure.

FIG. 2A illustrates two rays $r_c$ and $r_i$ that are cast into a 3D scene from an origin o and are suitable for use in implementing some embodiments of the present disclosure. The ray $r_c$ hits a triangle 205 at a 3D intersection point $p_c$ and the ray $r_i$ misses the triangle 205 in the 3D scene and hits the background at a 3D intersection point $p_i$. The two rays $r_c$ and $r_i$ form a cone and detect a discontinuity edge 210 defined by two vertices a and b in the cone footprint. The ray $r_c$ is at the center of the cone footprint and is defined as $r_c = o + t d_c$, where t is a hit distance from the origin o to the intersection point $p_c$. The ray $r_i$ has the same origin o as the ray $r_c$, but is offset in a direction $d_i$. The ray $r_i$ is at least one additional ray, where each additional ray is defined as $r_i = o + t d_i$. Tracing one or more additional rays (in addition to the center ray $r_c$) enables detection of visibility changes near the edge 210 through comparison between intersection points of the center ray and at least one additional ray to determine if any edge is intersecting the cone footprint.

If all rays within the cone footprint hit the same triangle 205, or have very similar hit distances, $t_{hit}$, it is likely that the rays hit the inside of an object, and there is no visibility gradient. Similarly, if all rays in the cone footprint miss the scene, the visibility gradient is zero. The interesting case is if the hit distances and triangle identifiers of the center ray and one of the rays $r_i$ are different. In that case, the intersection point of the one ray is likely close to a silhouette edge, such as the edge 210. Based on barycentric coordinates (u, v, w) of the triangle 205 intersected by $r_c$, the two triangle vertices a and b which define the edge 210 closest to the hit point within the triangle 205 are obtained by $$a, b = \begin{cases} v_1, v_2 & \text{if } w < v \text{ and } w < v \\ v_2, v_0 & \text{if } u < v \text{ and } u < w \\ v_0, v_1 & \text{otherwise.} \end{cases} \quad \text{Eq. (1)}$$

The hit point of the center ray is $p_c = o + t_{hit} d$, and interpolating along $r_i$, using the same $t_{hit}$, the hit point $p_i = o + t_{hit} d_i$. Next, the intersection between line $(1-\alpha) p_i + \alpha p_c$, and a plane defined by the ray origin, o, and the two triangle vertices a and b is computed. The factor $\alpha$ indicates a location at which a line 215 between the two hit points ($p_c$ and $p_i$) intersects a triangle edge (edge 210).

Figure 2B:
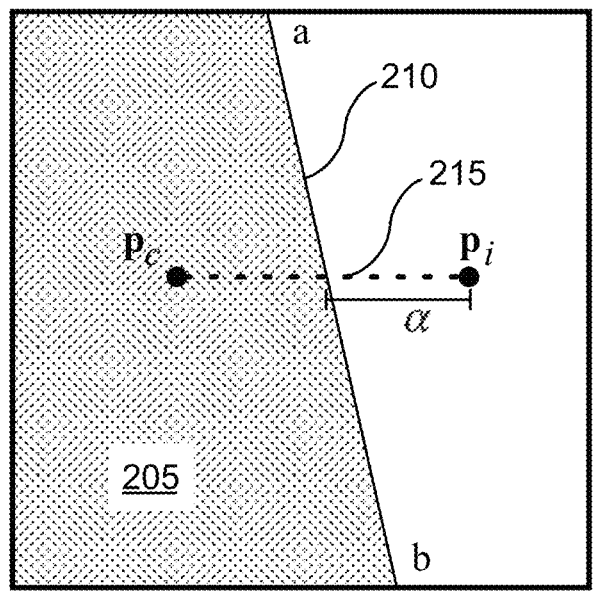
FIG. 2B illustrates a factor at a location on a triangle edge for use in implementing some embodiments of the present disclosure.

FIG. 2B illustrates a factor $\alpha$ at a location on a triangle edge for use in implementing some embodiments of the present disclosure. Let $n = (b-o) \times (a-o)$ define the (unnormalized) plane normal, then the $\alpha$ value of the intersection is given by $$\alpha = \frac{(p_i - o) \cdot n}{(p_i - p_c) \cdot n} = \frac{d_i \cdot n}{(d_i - d_c) \cdot n} \quad \text{Eq. (2)}$$

In an embodiment, detection of only one edge per cone is supported.

Figure 2C:
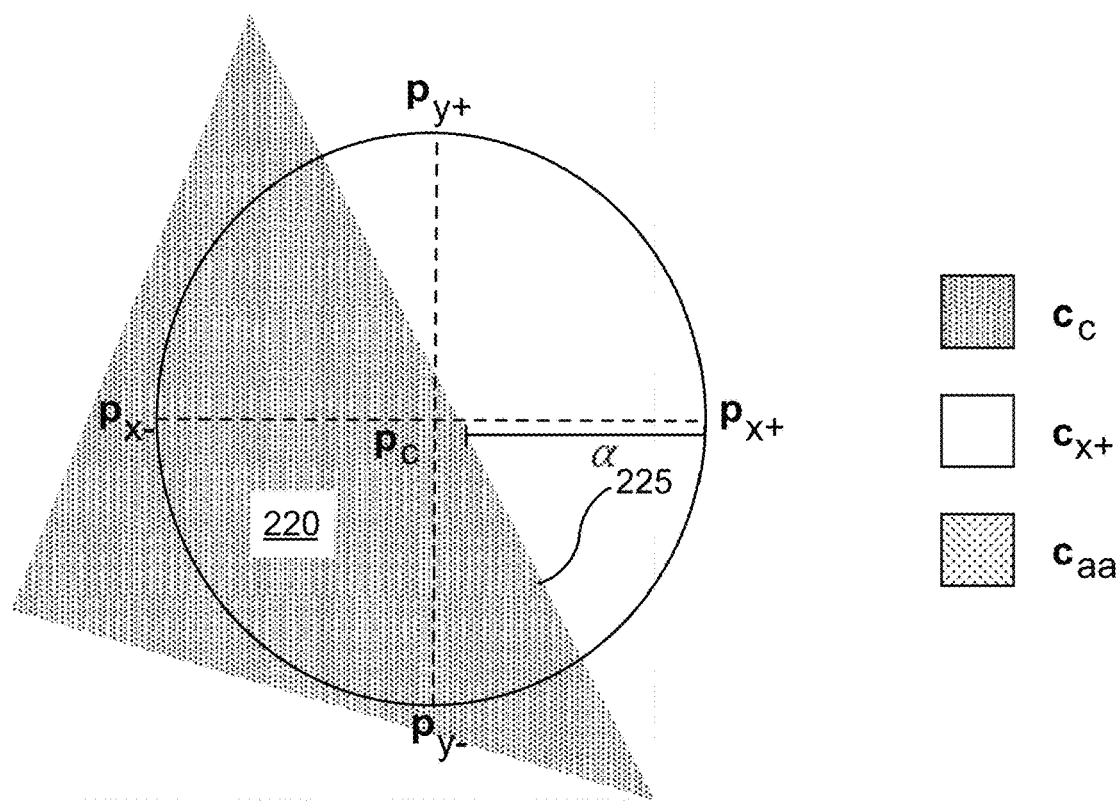
FIGS. 2C, 2D, and 2E illustrate examples of coverage for anti-aliasing suitable for use in implementing some embodiments of the present disclosure.

FIG. 2C illustrates an example of coverage for anti-aliasing suitable for use in implementing some embodiments of the present disclosure. To distinguish the cases where a detected edge 225 of a triangle 220 intersects both a horizontal and vertical segment, the following heuristic may be applied: First, a local orthonormal coordinate system u, v, and w, is created with the w-axis parallel to $d_c$, u parallel to $p_x - p_c$, and v parallel to $p_y - p_c$. Using the local orthonormal coordinate system, an edge is defined to be a valid horizontal edge if $|u \cdot n| \geq |v \cdot n|$ and similarly, an edge is defined to be a valid vertical edge if $|v \cdot n| > |u \cdot n|$.

The factor $\alpha$ is leveraged as an approximate anti-aliasing value to determine local coverage of a small cone traced along $r_c$. If the edge is vertical and $p_i - p_c$ is a horizontal offset, as illustrated in FIG. 2C, when $\alpha$ is close to zero, the edge passes close to $p_i$, hence, the coverage of the center ray should not be influenced much by the edge. In contrast, if $\alpha$ is close to one, as shown in FIG. 2C, the edge passes close to $p_c$, and more of the color from the hit point p should be used. A similar argument holds for a horizontal edge. The anti-aliased coverage computation for the center ray by the triangle 225 may be based on the anti-aliased coverage computation for rasterization in 2D described by Laine et al. "Modular Primitives for High-Performance Differentiable Rendering," *ACM Transactions of Graphics* 39, 6, Article 194 (2020). The anti-aliased coverage in 3D $C_{aa}$ is defined as:

$$C_{aa}=(1.0-0.5a) \cdot c_c + 0.5\alpha c_i \qquad \text{Eq. (3)}$$

where $c_c$ is the binary coverage of the intersection of ray $r_c$ and $c_i$ is the corresponding coverage of ray $r_i$. The anti-aliased coverage is a smoothly varying value that can be differentiated to compute a gradient. In contrast, the aliased (binary) coverage does not vary smoothly and cannot be used directly to compute a gradient.

Figure 2D:
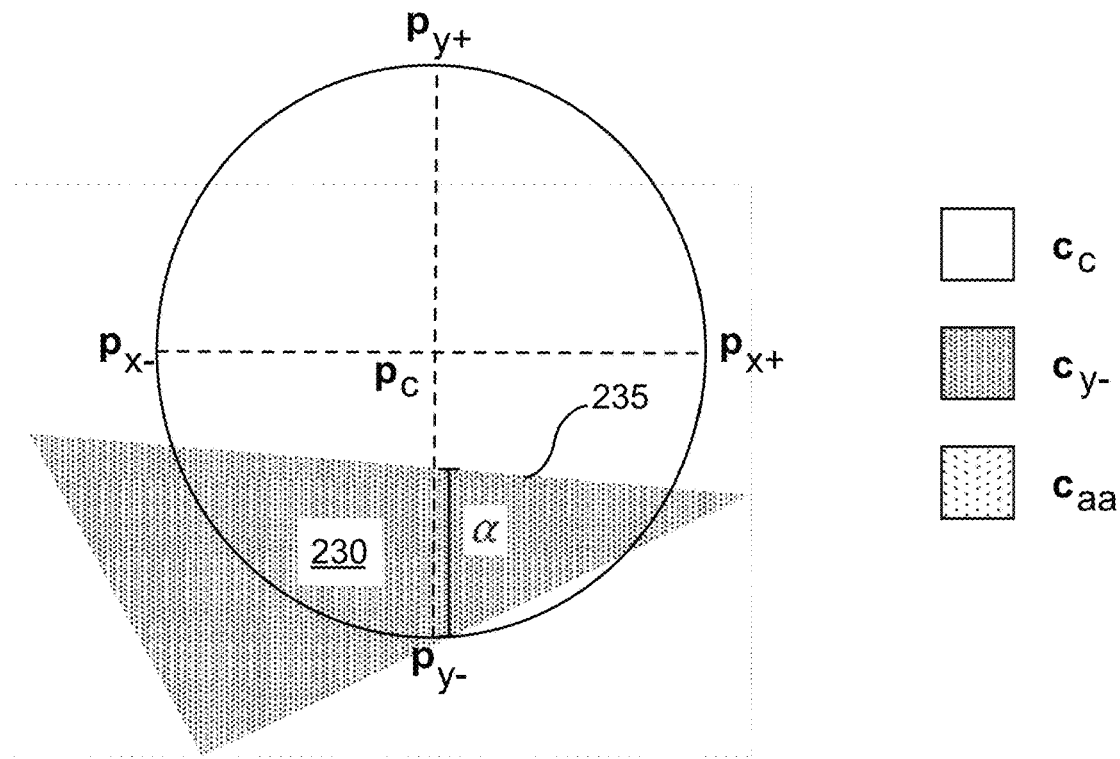

FIG. 2D illustrates an example of coverage for anti-aliasing suitable for use in implementing some embodiments of the present disclosure. A detected edge 230 intersects the vertical segment and is defined to be a valid horizontal edge. As shown by $C_{aa}$, the contribution of the coverage for the center ray by a triangle 235 is less compared with $C_{aa}$ in FIG. 2C.

Figure 2E:
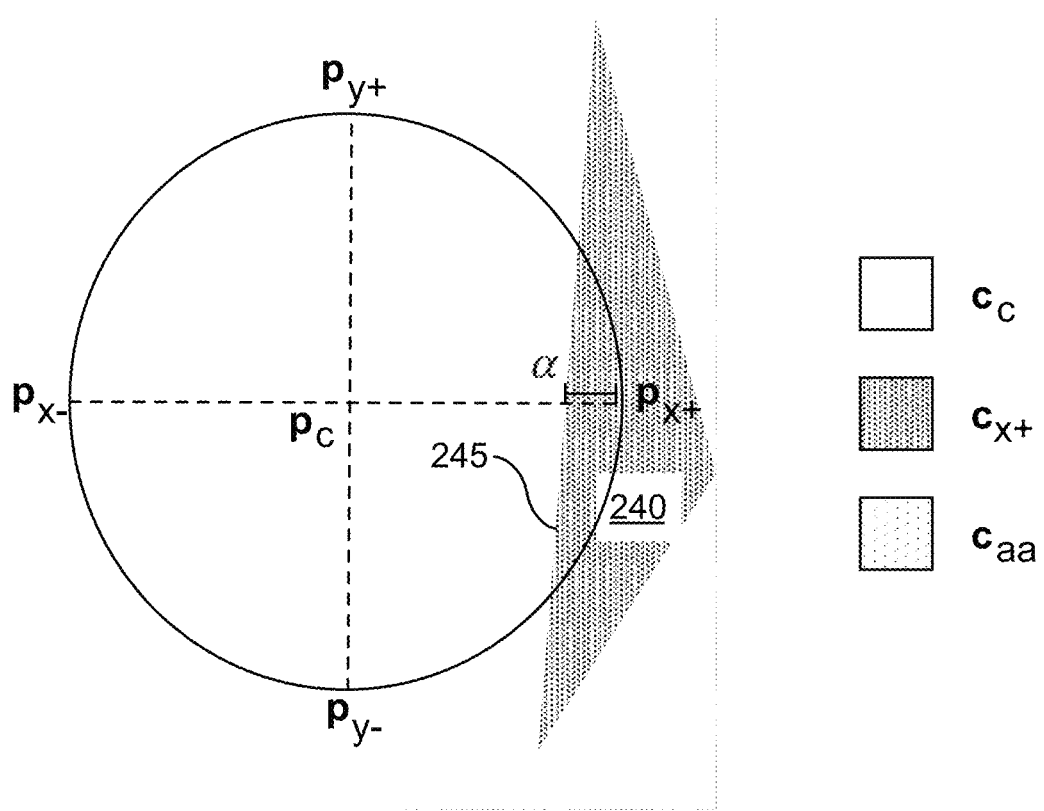

FIG. 2E illustrates an example of coverage for anti-aliasing suitable for use in implementing some embodiments of the present disclosure. A detected edge 240 intersects the horizontal segment and is defined to be a valid vertical edge. As shown by $C_{aa}$, the contribution of the coverage for the center ray by a triangle 245 is less compared with $C_{aa}$ in FIGS. 2C and 2D.

With the definition of anti-aliased coverage, gradients can be computed to the triangle vertices, ray origin and direction. Gradients to the triangle vertices deform the 3D model and gradients to the ray origin and direction adjust the lighting configuration and surface normal vector. Given a reference coverage $c_{ref}$ and the anti-aliased coverage $C_{aa}$, a loss can be defined by, e.g., computing the mean square error of the coverage differences. The loss gradient can then be backpropagated to the optimization variables, including geometry (topology and shape), material, and lighting configuration.

For example, the loss gradients toward the triangle vertex a can be expressed (showing the x-component) using the chain rule as:

$$\frac{\partial L}{\partial a_x} = \frac{\partial L}{\partial c_{aa}} \frac{\partial c_{aa}}{\partial \alpha} \frac{\partial \alpha}{\partial a_x}. \qquad \text{Eq. (4)}$$

The first term is straightforward and depends on a chosen loss function L. The second term follows easily from Equation (3) as $$\left( \frac{\partial c_{aa}}{\partial \alpha} = 0.5(c_i - c_c) \right).$$

The last term can be evaluated by directly differentiating Equation (2).

$$\frac{\partial \alpha}{\partial a_x} = \frac{1}{(d_i - d_c) \cdot n} \left[ d_i \cdot \frac{\partial n}{\partial a_x} - \alpha(d_i - d_c) \cdot \frac{\partial n}{\partial a_x} \right] \qquad \text{Eq. (5)}$$

$$\frac{\partial n}{\partial a_x} = (0, b_z - o_z, -b_y + o_y) \qquad \text{Eq. (6)}$$

The gradients in the other dimensions and for the other vertices follow similarly. In an embodiment, four rays are traced to detect edges, offset in two perpendicular directions in a local coordinate frame defined by the ray direction of the center ray, and only one detected edge may contribute to the analytical anti-aliasing test. In an embodiment, only one random ray is traced on the surface of a cone centered around the center ray. However, the randomized ray selection does introduce more noise.

Unlike Monte Carlo path tracing, the analytical anti-aliasing test allows decoupling of shading and visibility rates in the differentiable renderer. For example, even though five rays are traced to detect edges, only two shading operations are needed at the hit point to obtain visibility gradients given anti-aliased resolved pixel colors. For shadow queries, no shading is necessary.

Alternatively, reparameterization techniques have been proposed, which, for each ray corresponding to the center ray a few additional rays are traced within a cone centered around the center ray. Based on the intersections of the rays, a silhouette edge is detected within the cone. If an edge is detected, the integral over the ray footprint is reparameterized by a change of variables, carefully chosen to remove the visibility discontinuity caused by the silhouette edge.

Similar to reparameterization, the analytical anti-aliasing test also locally detects a discontinuity edge based on tracing a few rays in a small cone footprint. However, in contrast with reparameterization techniques, the analytical anti-aliasing function is directly evaluated instead of evaluating a coverage integral by taking many random samples, such as by Monte Carlo sampling. Evaluating the analytical anti-aliasing function simplifies implementation of the 3D model optimization system 100, increases performance and provides noise-free (but biased) visibility gradients. For many differentiable rendering tasks, the trade-off between increased performance and biased visibility gradients is practically useful.

Figure 3A:
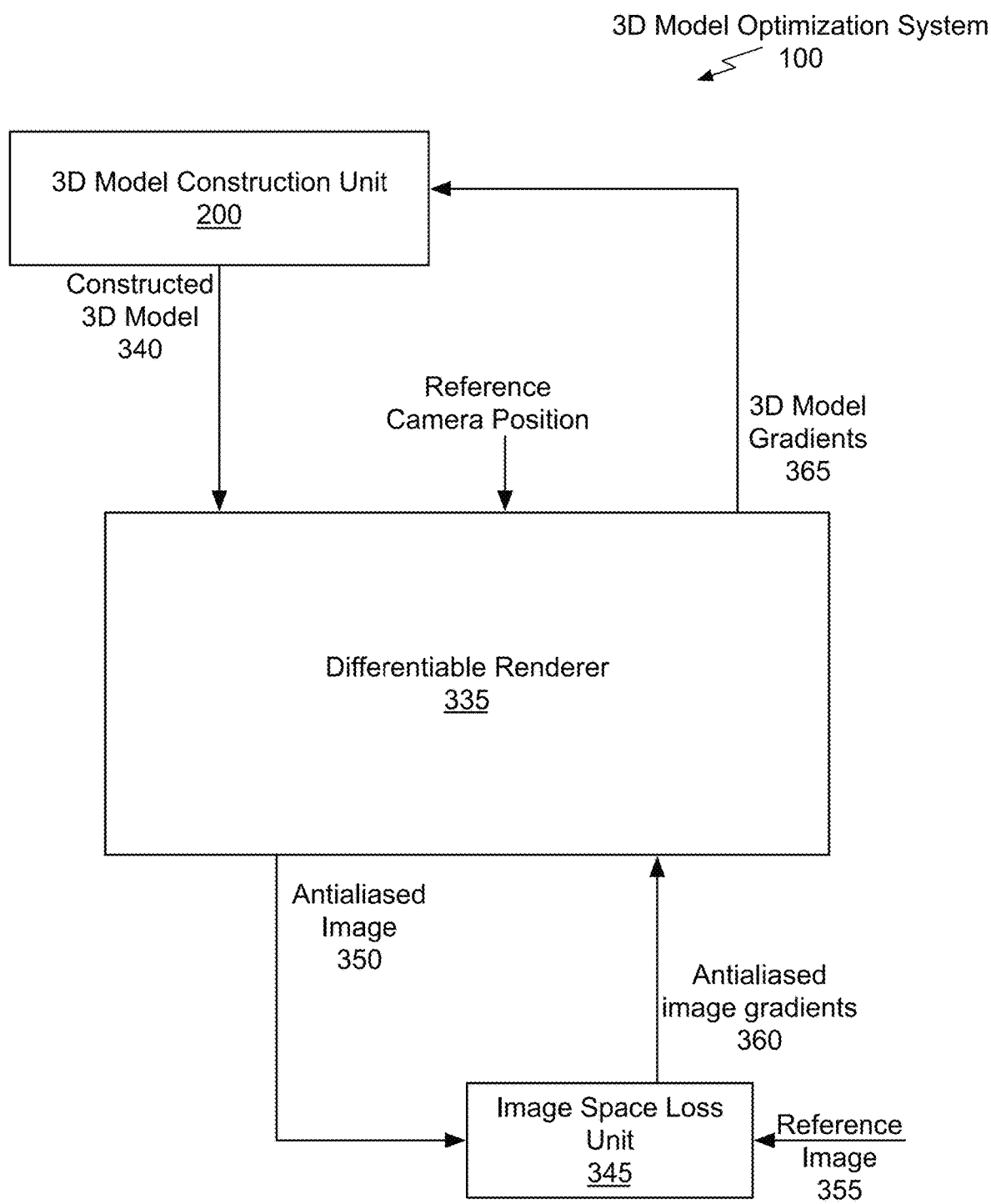
FIG. 3A illustrates another conceptual diagram of a 3D model optimization system, in accordance with an embodiment.

FIG. 3A illustrates a block diagram of an example 3D model optimization system 100, as shown in FIGS. 1A and 1B, suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the 3D model optimization system 100 is within the scope and spirit of embodiments of the present disclosure.

The 3D model optimization system 100 includes a 3D model construction unit 200, a differentiable renderer 215, and an image space loss unit 245. The 3D model construction unit 200 provides a representation of a constructed 3D model 340 to the differentiable renderer 335 along with a reference camera position. In an embodiment, an initial 3D model may be a base mesh that is as simple as a cube or sphere. In an embodiment, the constructed 3D model 340 comprises vertices in 3D model space and attributes associated with the vertices. In an embodiment, the constructed 3D model 340 includes material properties, such as a surface texture map. An initial surface texture map corresponding to the initial 3D model may be a uniform color. A 3D model is rendered (via ray casting) from a camera position in a forward pass through the differentiable renderer 335 to produce an antialiased image 350 of the constructed 3D model 340 viewed from the reference camera position.

The image space loss unit 345 determines an image space (color) loss based on per-pixel color differences between the antialiased image 350 and a reference (target) image 355 of the object or scene associated with the reference camera position. The differences quantify the accuracy of the 3D model of the object or scene and represent a "loss". In an embodiment, the differences are computed as a mean square per-pixel difference. The image space loss penalizes 3D model solutions where the antialiased image 350 does not match the reference image 355. However, the image space loss unit 245 may use other loss functions along with the image space loss to regularize the optimization. In an embodiment, a Laplacian loss penalizes solutions where the curvature of the mesh changes severely compared to the base mesh, effectively encouraging the optimization to favor solutions with smoother surface geometry.

The differentiable renderer 215 receives antialiased image gradients 360 that indicate how the color of each pixel of the antialiased image 350 affects the loss. The forward rendering, comparison with a reference image 355, and backwards propagation are performed for multiple camera positions to produce a surface texture map and geometry for a modified version of the initial 3D model or base mesh for each reference image 355. The result is a constructed 3D model of the object or scene and corresponding surface texture map that, when rendered match the reference images. Using multiple camera positions enables the optimization of different portions of the object through the analytic antialiasing due to the variety of discontinuity edges that are detected.

After the antialiased image gradients 360 are backwards propagated through the entire differentiable renderer 335, it is possible to quantify how changing the latent variables affects the loss, and the latent variables can be adjusted in the direction that should reduce the loss according to 3D model gradients 365. The visibility-related 3D model gradients that are computed during backpropagation indicate the effect that moving the vertex positions has on the antialiased image 350 due to changes in fractional coverage of the center rays. The 3D model construction unit 200 receives the 3D model gradients 365 and adjusts the constructed 3D model 340 to reduce the loss.

Replacing the Monte Carlo integral evaluation that is performed using many samples with an analytical test, noise is reduced and runtime performance is increased. The 3D model construction unit 200 may jointly learn mesh topology, shape, material parameters for a 3D scene or object model through differentiable ray casting. Lighting configuration may be known or learned. The 3D scene or object model is editable, interactive, and compatible with existing applications.

Figure 3B:
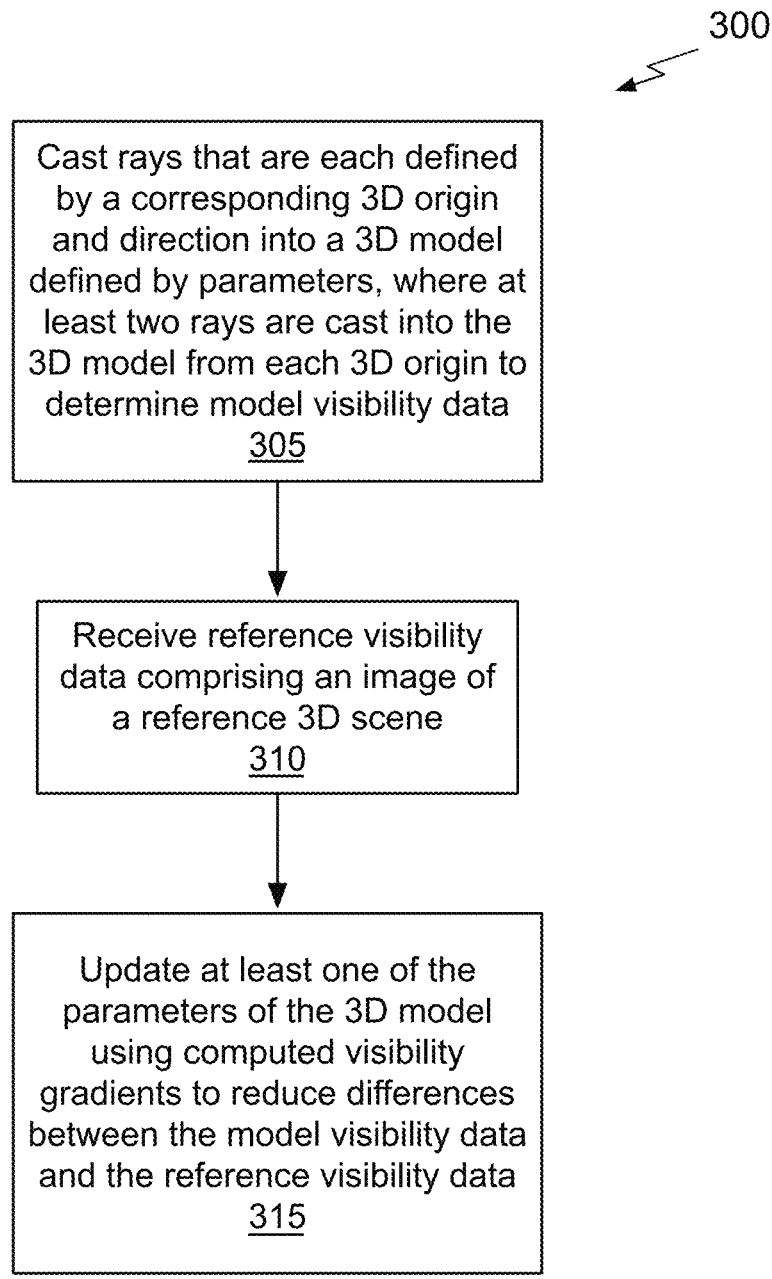
FIG. 3B illustrates a flowchart of a method for 3D model optimization suitable for use in implementing some embodiments of the present disclosure.

FIG. 3B illustrates a flowchart of a method 300 for 3D model optimization suitable for use in implementing some embodiments of the present disclosure. Each block of method 300, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 300 is described, by way of example, with respect to the 3D mode optimization system 100 of FIGS. 1A, 1B, and 3A. However, this method may additionally or alternatively be executed by any one system, or any combination of systems, including, but not limited to, those described herein. Furthermore, persons of ordinary skill in the art will understand that any system that performs method 300 is within the scope and spirit of embodiments of the present disclosure.

At step 305, rays that are each defined by a corresponding 3D origin and direction are cast into a 3D model defined by parameters, where at least two rays are cast into the 3D model from each 3D origin to determine model visibility data. In an embodiment, the at least two rays comprises a center ray of a cone and an additional ray that defines footprint of the cone. In an embodiment, model visibility data comprises $\alpha$, $C_{aa}$, and/or anti-aliased pixel color according to coverage of the center ray. In an embodiment, the parameters correspond to geometry (topology and shape) and material. In an embodiment, the parameters include lighting configuration. In an embodiment, the image is a photograph.

At step 310, reference visibility data comprising an image of a reference 3D scene is received. At step 315, at least one of the parameters of the 3D model are updated using computed visibility gradients to reduce differences between the model visibility data and the reference visibility data.

In an embodiment, the 3D model is rendered according to the model visibility data to produce a model image, the reference 3D scene is rendered according to the reference visibility data to produce a reference image, and image space gradients are propagated to determine the visibility gradients and reduce differences between the model image and the reference image. In an embodiment, the model image and the reference image include shadows resulting from an object obstructing a light source. In an embodiment, the at least two rays cast from the same 3D origin identify an edge of an object in the reference 3D scene. In an embodiment, an anti-aliased coverage value is computed based on the edge. In an embodiment, updating the parameters comprises propagating the visibility gradients to update the anti-aliased coverage value and deforming geometry of the 3D model based on the updated anti-aliased coverage value. In an embodiment, an analytical function is evaluated to compute the anti-aliased visibility value. In an embodiment, at least a portion of the rays are cast into a reference 3D scene to compute the reference visibility data.

Figure 3C:
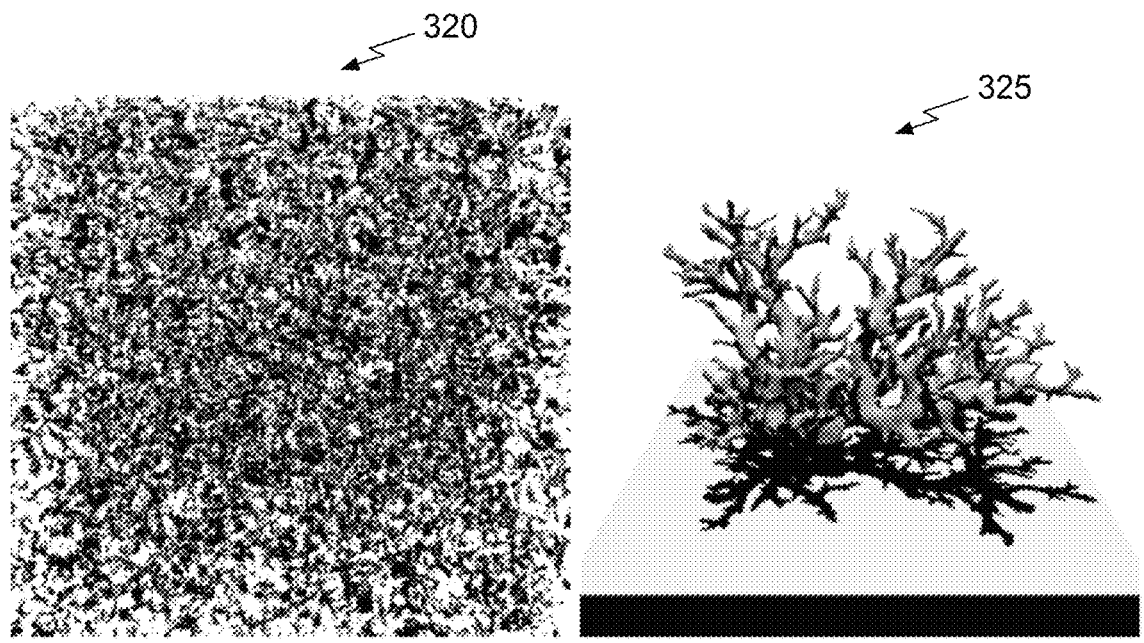
FIG. 3C illustrates an initial 3D model and reference 3D scene suitable for use in implementing some embodiments of the present disclosure.

FIG. 3C illustrates an initial 3D model 320 and reference 3D scene 325 suitable for use in implementing some embodiments of the present disclosure. The initial 3D model 320 is optimized using the visibility gradients to match the reference 3D scene 325.

Figure 3D:
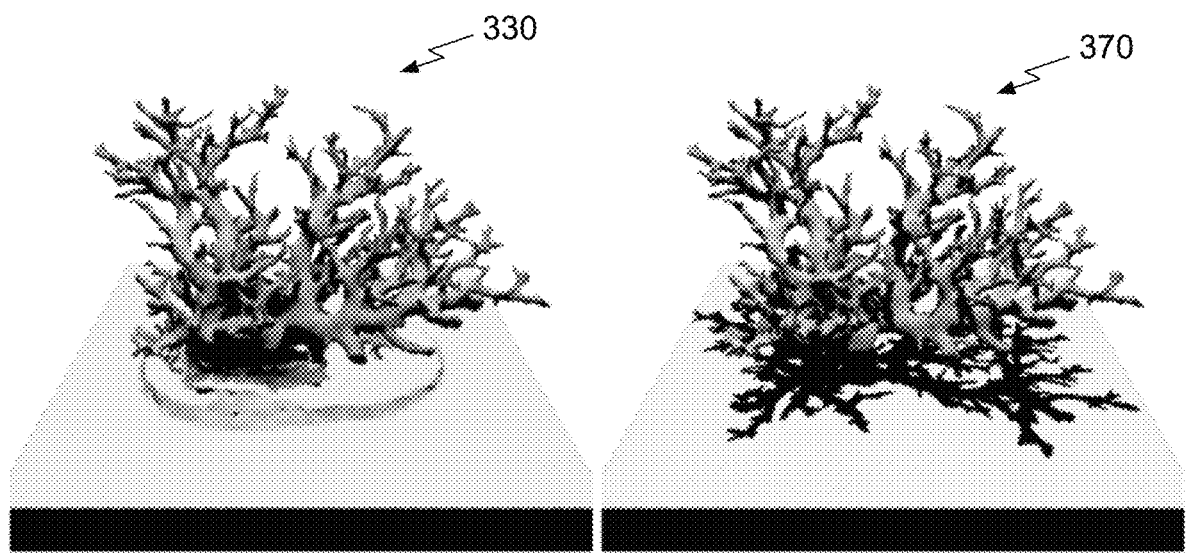
FIG. 3D illustrates a rendered optimized 3D model suitable for use in implementing some embodiments of the present disclosure.

FIG. 3D illustrates a rendered optimized 3D model suitable for use in implementing some embodiments of the present disclosure. FIG. 3D illustrates an image 330 of the optimized 3D model rendered without shadows (and a known light position) and an image 370 of the optimized 3D model rendered with shadows. When the optimized 3D model is rendered without shadows artifacts are introduced into the material parameters due to the image space differences. While the light position is known, the position may be varied in each training step (optimization iteration). Given that the image 330 is rendered without shadows, the optimization process instead tries to bake the shadow term into the albedo texture, but given that the shadow moves in each training step, it can only bake an average shadow, which is very bland. In contrast, in the image 370, the differentiable renderer 335 computes an explicit shadow term, and in this case, the optimization no longer bakes the shadow into the texture. As a consequence, a higher quality approximation is produced, and also better geometry reconstruction.

Limiting the number of rays that are cast (at least two per origin) produces a noise-free 3D model of a scene or object and provides improved performance in terms of runtime performance. The reason for lower noise levels compared with conventional techniques that rely on sampling with many rays, is that an area Monte Carlo sampling step is replaced with an analytical test. The analytical test detects a single edge and computes the fraction of the cone area is covered by the triangle containing the edge. Shading is performed twice per ray cone to determine a blended color based on intersections of the at least two rays. When shadows are rendered, no shading at the intersections is needed because it is only necessary to determine if the rays reach a light or are occluded, and at what distance the occlusion occurs.

The primary goal of the 3D model optimization system 100 is to construct an accurate 3D model of an object or scene. While the 3D model optimization system 100 may also render antialiased images of the 3D model, generation of high-quality images should be considered as a secondary goal. The differentiable renderer 335 provides a framework for programmable shading and geometry processing, providing a high degree of user control through and the ability to render high-resolution images of scenes including millions of geometric primitives. The differentiable renderer 335 provides custom, high-performance implementations for: ray casting, shadow rendering, and antialiasing and differentiation operations for constructing an accurate 3D model.

Parallel Processing Architecture

Figure 4:
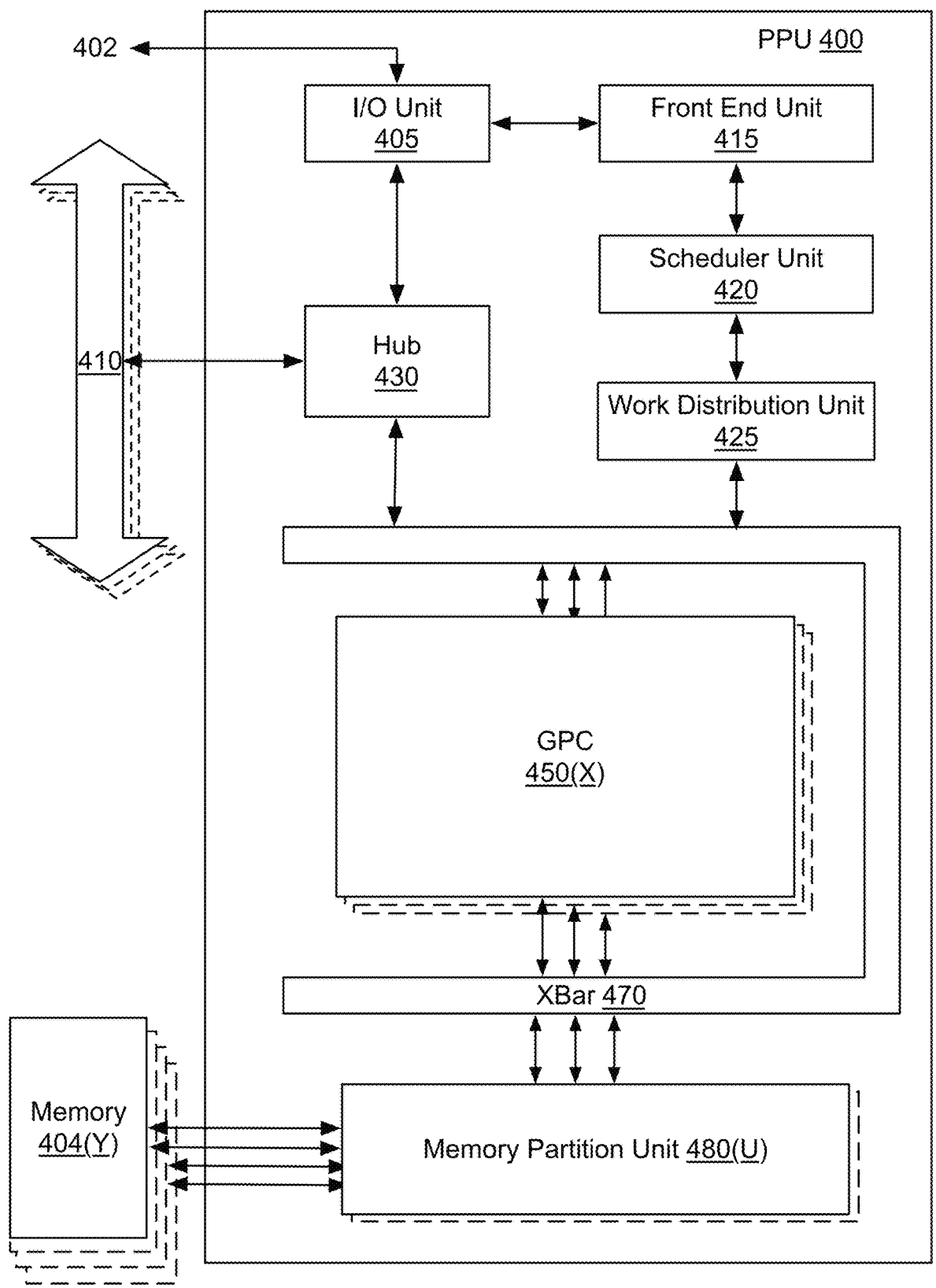
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the 3D model optimization system 100 and/or the differentiable renderer 215. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QOS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half (J. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation $D=A \times B+C$, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
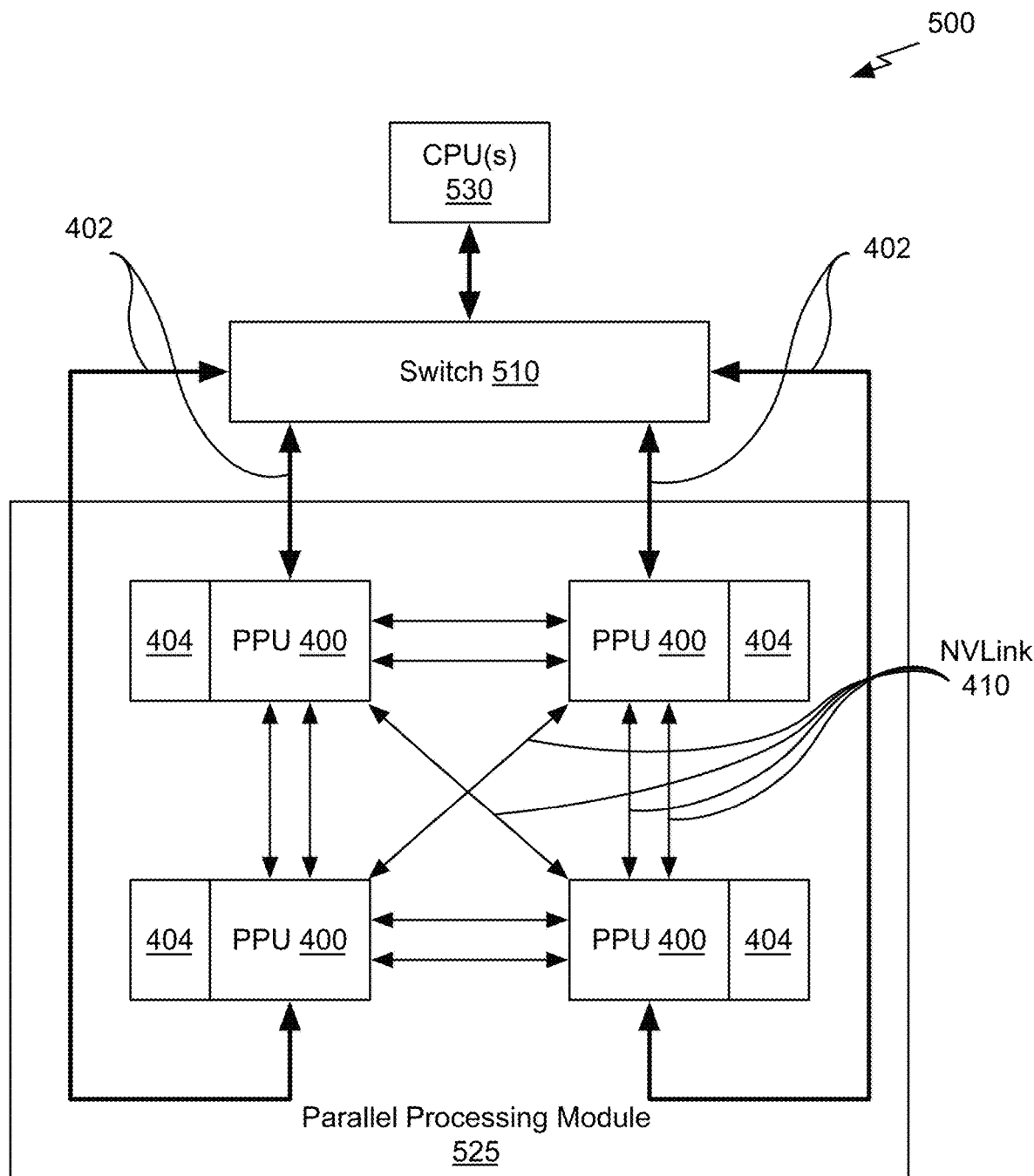
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 565 may be configured to implement the 3D model optimization system 100 and/or the method 300 shown in FIG. 3B. The processing system 500 includes a CPU 530, switch 510, and multiple PPUs 400, and respective memories 404.

Figure 5B:
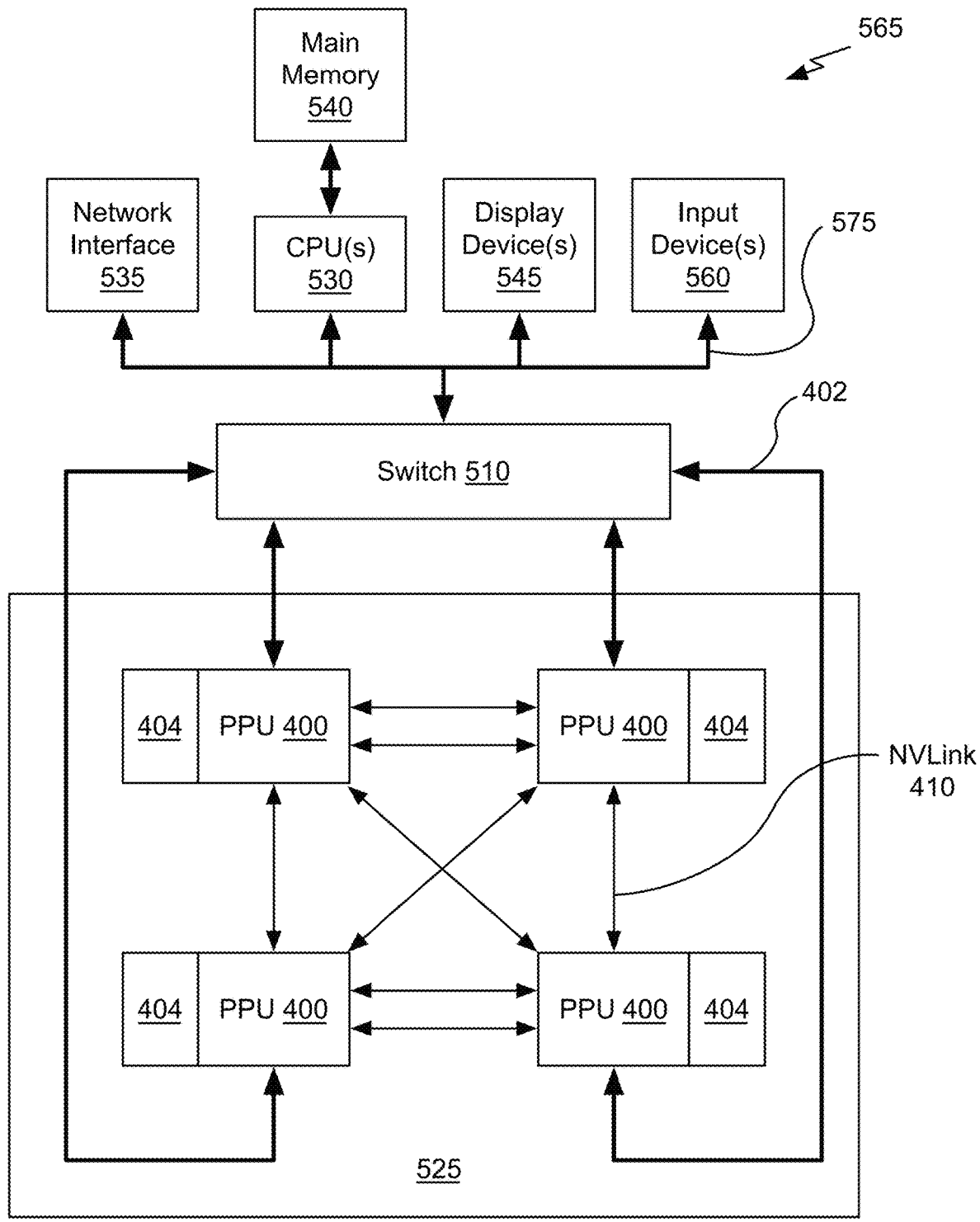
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabits/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the 3D model optimization system 100 and/or the method 300 shown in FIG. 3B.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Figure 5C:
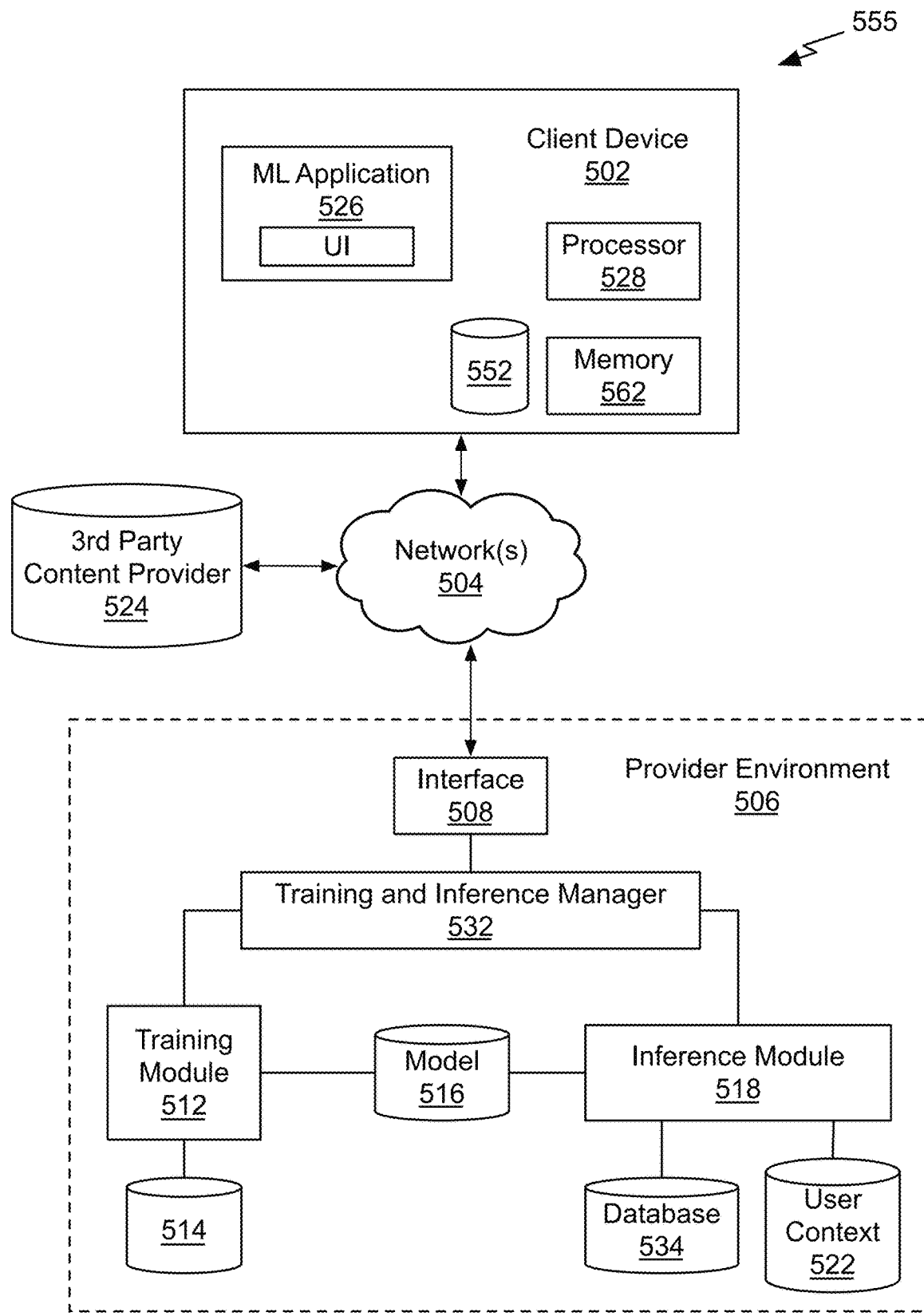
FIG. 5C illustrates components of an exemplary system that can be used to train and utilize machine learning, in at least one embodiment.

Although the various blocks of FIG. 5C are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5C is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5C.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5B and/or exemplary system 565 of FIG. 5C. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA Geforce Now (GFN), Google Stadia, and the like.

Example Streaming System

Figure 6:
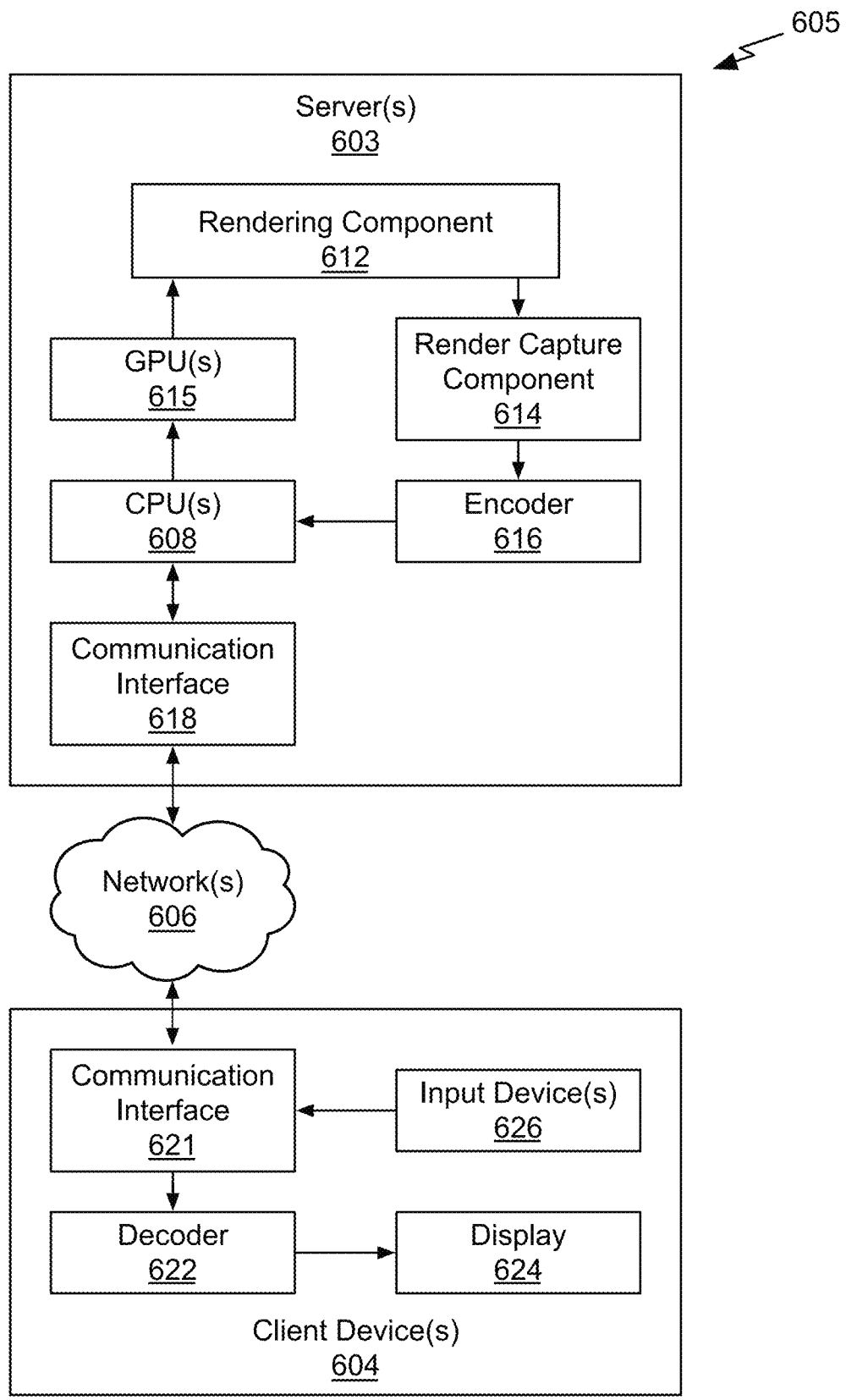
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In the system 605, for a game session, the client device(s) 604 may only receive input data in response to inputs to the input device(s), transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units-such as GPUs 615, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
   casting rays that are each defined by a corresponding 3D origin and direction into a 3D model defined by parameters, wherein at least two rays are cast into the 3D model from each 3D origin to determine model visibility data including at least one anti-aliased coverage value associated with a primitive of the 3D model that is intersected by one of the at least two rays;
   receiving reference visibility data comprising an image of a reference 3D scene; and
   updating at least one of the parameters of the 3D model using computed coverage differences represented by visibility gradients to reduce differences between the model visibility data and the reference visibility data.

2. The computer-implemented method of claim 1, wherein the parameters correspond to at least one of geometry, lighting configuration, and material.

3. The computer-implemented method of claim 1, further comprising:
   rendering the 3D model according to the model visibility data to produce a model image;
   rendering the reference 3D scene according to the reference visibility data to produce a reference image; and
   combining image space gradients with the visibility gradients for updating the parameters.

4. The computer-implemented method of claim 3, wherein the model image and the reference image include shadows resulting from an object obstructing a light source.

5. The computer-implemented method of claim 1, wherein the at least two rays cast from the same 3D origin identify an intersection point on an edge of an object in the reference 3D scene.

6. The computer-implemented method of claim 5, further comprising computing the at least one anti-aliased coverage value based on the intersection point.

7. The computer-implemented method of claim 6, wherein an analytical function is evaluated to compute the at least one anti-aliased visibility value.

8. The computer-implemented method of claim 1, wherein updating the parameters comprises:
   propagating the visibility gradients to update the at least one anti-aliased coverage value; and
   deforming geometry of the 3D model based on the updated at least one anti-aliased coverage value.

9. The computer-implemented method of claim 1, wherein at least a portion of the rays are cast into a reference 3D scene to compute the reference visibility data.

10. The computer-implemented method of claim 1, wherein the image is a photograph.

11. The computer-implemented method of claim 1, wherein at least one of the steps of casting, receiving, and updating are performed on a server or in a data center and the 3D model is streamed to a user device.

12. The computer-implemented method of claim 1, wherein at least one of the steps of casting, receiving, and updating are performed within a cloud computing environment.

13. The computer-implemented method of claim 1, wherein the steps of casting, receiving, and updating are performed for training, testing, or certifying a neural network employed in a machine, robot, or autonomous vehicle.

14. The computer-implemented method of claim 1, wherein at least one of the steps of casting, receiving, and updating is performed on a virtual machine comprising a portion of a graphics processing unit.

15. A system, comprising:
    processor configured to:
    cast rays that are each defined by a corresponding 3D origin and direction into a 3D model defined by parameters, wherein at least two rays are cast into the 3D model from each 3D origin to determine model visibility data including at least one anti-aliased coverage value associated with a primitive of the 3D model that is intersected by one of the at least two rays;
    receive reference visibility data comprising an image of a reference 3D scene; and
    update at least one of the parameters of the 3D model using computed coverage differences represented by visibility gradients to reduce differences between the model visibility data and the reference visibility data.

16. The system of claim 15, further comprising:
    rendering the 3D model according to the model visibility data to produce a model image;
    rendering the reference 3D scene according to the reference visibility data to produce a reference image; and
    combining image space gradients with the visibility gradients for updating the parameters.

17. The system of claim 15, wherein the at least two rays cast from the same 3D origin identify an intersection point on an edge of an object in the reference 3D scene.

18. The system of claim 17, wherein the processor is further configured to compute the at least one anti-aliased coverage value based on the intersection point.

19. A non-transitory computer-readable media storing computer instructions that, when executed by one or more processors, cause the one or more processors to perform the steps of:
    casting rays that are each defined by a corresponding 3D origin and direction into a 3D model defined by parameters, wherein at least two rays are cast into the 3D model from each 3D origin to determine model visibility data including at least one anti-aliased coverage value associated with a primitive of the 3D model that is intersected by one of the at least two rays;
    receiving reference visibility data comprising an image of a reference 3D scene; and
    updating at least one of the parameters of the 3D model using computed coverage differences represented by visibility gradients to reduce differences between the model visibility data and the reference visibility data.

20. The non-transitory computer-readable media of claim 19, wherein the parameters correspond to at least one of geometry, lighting configuration, and material.

\* \* \* \* \*